No. 673,579. Patented May 7, 1901.
M. KLEINBERGER.
MEASURING SLIDE RULER.
(Application filed Feb. 15, 1901.)
(No Model.)
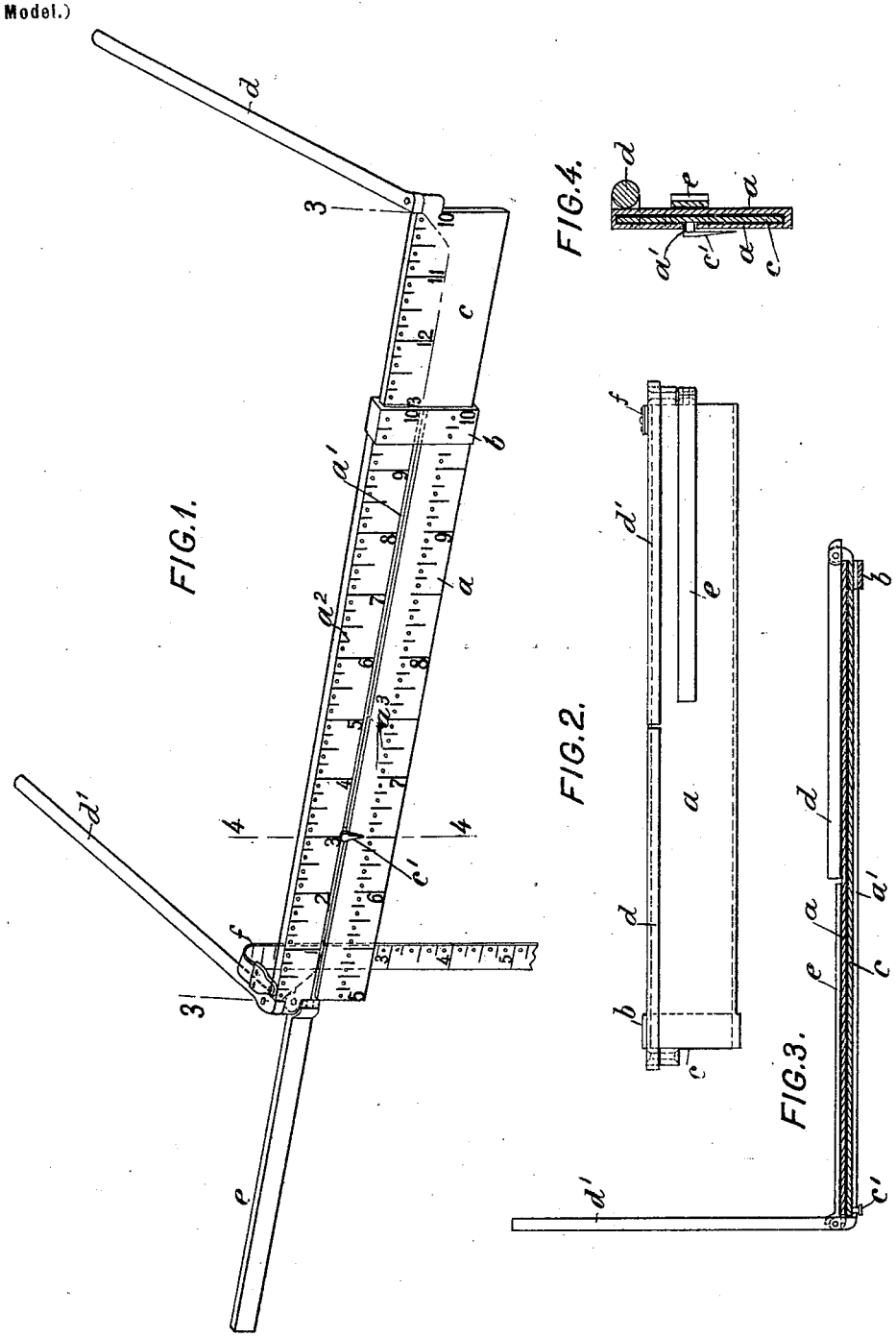
Witnesses:
John Becker.
Edw Ray.
Inventor:
Markus Kleinberger
by his attorneys
Roeder & Briesen

UNITED STATES PATENT OFFICE.

MARKUS KLEINBERGER, OF NEW YORK, N. Y.

MEASURING SLIDE-RULER.

SPECIFICATION forming part of Letters Patent No. 673,579, dated May 7, 1901.

Application filed February 15, 1901. Serial No. 47,396. (No model.)

*To all whom it may concern:*

Be it known that I, MARKUS KLEINBERGER, a citizen of the United States, and a resident of New York city, county and State of New York, have invented certain new and useful Improvements in Measuring Slide-Rulers, of which the following is a specification.

This invention relates to a slide-ruler more particularly designed for tailors' use and adapted to show the full measure and also the half-measure or center of any measurement taken, so that the tailor need not make any mental calculations.

The invention consists in the various features of construction pointed out in the claims.

In the accompanying drawings, Figure 1 is a front perspective view of my improved measuring slide-ruler. Fig. 2 is a rear view thereof. Fig. 3 is a longitudinal section of the same on line 3 3, Fig. 1, showing the arms in a different position; and Fig. 4, an enlarged cross-section on line 4 4, Fig. 1.

The letter $a$ represents a hollow or chambered ruler having a longitudinal slot $a'$ formed in one face and reinforced at one end by an encircling band $b$, that serves also to close the end of slot $a'$ and limit the movement of the slide.

Upon one outer edge of ruler $a$ is marked an inch-scale $a^2$, and upon one edge of slot $a'$ is marked a double scale $a^3$—viz., a scale in which each main subdivision is of twice the length of each main subdivision of scale $a^2$. If each main subdivision of scale $a^2$ is an inch, each main subdivision in scale $a^3$ is two inches.

Within the pocket formed by the hollow ruler $a$ is contained a longitudinally-movable graduated slide $c$, provided with a pointer $c'$, that projects outwardly through slot $a'$ and moves along the scale $a^3$. To the free end of slide $c$ is connected, by means of a stop-hinge, an arm $d$, adapted to be projected at right angles to the slide, while a similar arm $d'$ is hinged to the opposite end of ruler $a$. A third arm $e$ is hinged to the end of ruler $a$ and when opened out forms an extension of such ruler, standing at right angles to arms $d$ and $d'$. A tape $f$ is also connected to end of ruler $a$.

To obtain, say, a horizontal back-measurement, the arms $d\ d'$ are folded out and projected beneath the arms of the person measured, while the slide $c$ is manipulated until the arms $d\ d'$ snugly fit the figure. The full back-measure may now be read off on the slide $c$ at the point in line with the outer edge of band $b$, the drawings showing the ruler set to thirteen inches, this being the full length of ruler $a$ plus the exposed part of slide $c$.

In taking measures for tailors it is frequently desirable that one-half of the full measure should also be read off, so that the center may be ascertained without calculation. This half-measure is indicated by the pointer $c'$ upon the scale $a^3$, the drawings showing the pointer set at "$6\frac{1}{2}$."

The zero or left-hand point of scale $a^3$ should start at a number ("5") equal to one-half the number of inches on scale $a^2$, ("10,") and as the divisions on scale $a^3$ are twice as long as those on division $a^2$ and slide $c$ a full division movement of slide $c$ will cause but a half-division movement of the pointer along scale $a^3$, so that each full measure is halved, as desired.

The arm $e$ when folded outward serves as an abutment for obtaining various other measurements.

What I claim is—

1. The combination of a slotted chambered ruler having a scale formed along one edge, and a doubly-sized scale formed along the slot, with an inclosed slide having a scale, and with a pointer secured to the slide and adapted to move along the slot-scale, substantially as specified.

2. The combination of a slotted chambered ruler having a scale formed along one edge, and a doubly-sized scale formed along the slot, with an inclosed slide having a scale, a pointer secured to the slide and adapted to move along the slot-scale, an arm hinged to the slide, and two arms adapted to be projected at right angles to each other and hinged to the ruler, substantially as specified.

Signed by me at New York city, county and State of New York, this 11th day of February, 1901.

MARKUS KLEINBERGER.

Witnesses:
WILLIAM SCHULZ,
F. V. BRIESEN.